US006123760A

United States Patent [19]

Varnell

[11] Patent Number: 6,123,760
[45] Date of Patent: *Sep. 26, 2000

[54] COMPOSITIONS AND METHODS FOR PREPARING DISPERSIONS AND METHODS FOR USING THE DISPERSIONS

[75] Inventor: Daniel Felix Varnell, Wilmington, Del.

[73] Assignee: Hercules Incorporated, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 09/184,458

[22] Filed: Oct. 28, 1998

[51] Int. Cl.[7] .......................... C09D 7/12; C09D 101/26; C09D 101/28

[52] U.S. Cl. .................................... 106/174.1; 106/209.1; 106/218; 106/236; 106/287.2; 106/287.21; 106/287.24; 106/287.27; 106/287.35

[58] Field of Search ............................. 106/174.1, 209.1, 106/218, 236, 287.2, 287.21, 287.24, 287.27, 287.35

[56] References Cited

U.S. PATENT DOCUMENTS

| | | | |
|---|---|---|---|
| 2,627,477 | 2/1953 | Downey | 106/170 |
| 2,628,918 | 2/1953 | Wilson et al. | 106/238 |
| 2,684,300 | 7/1954 | Wilson et al. | 92/3 |
| 2,873,203 | 2/1959 | Hopkins et al. | 106/238 |
| 3,582,464 | 6/1971 | Aldrich | 462/180 |
| 3,931,069 | 1/1976 | Lundin | 260/17 |
| 3,996,654 | 12/1976 | Johnson | 29/458 |
| 4,228,277 | 10/1980 | Landoll | 536/90 |
| 4,263,182 | 4/1981 | Aldrich | 260/9 |
| 4,296,012 | 10/1981 | Okumichi et al. | 260/29.6 |
| 4,374,673 | 2/1983 | Aldrich | 106/212 |
| 4,405,408 | 9/1983 | Yoshioka et al. | 162/158 |
| 4,522,686 | 6/1985 | Dumas | 162/158 |
| 4,540,635 | 9/1985 | Ronge et al. | 428/498 |
| 4,614,546 | 9/1986 | Schroer et al. | 106/213 |
| 4,861,376 | 8/1989 | Edwards et al. | 106/123.1 |
| 4,919,724 | 4/1990 | Cenisio et al. | 106/199 |
| 4,927,496 | 5/1990 | Walkden | 162/136 |
| 5,145,522 | 9/1992 | Nakagawa et al. | 106/287.17 |
| 5,201,944 | 4/1993 | Nakata et al. | 106/144 |
| 5,403,392 | 4/1995 | Craig | 106/162 |
| 5,425,806 | 6/1995 | Doolan et al. | 106/203 |
| 5,474,843 | 12/1995 | Lambert et al. | 428/327 |
| 5,484,509 | 1/1996 | Famili et al. | 162/135 |
| 5,484,952 | 1/1996 | Nolan et al. | 549/329 |
| 5,525,738 | 6/1996 | Zhang | 549/329 |
| 5,658,377 | 8/1997 | Craig | 106/162.1 |
| 5,685,815 | 11/1997 | Bottorff et al. | 493/186 |
| 5,725,731 | 3/1998 | Brungardt et al. | 162/72 |
| 5,766,417 | 6/1998 | Brungardt | 162/158 |
| 5,846,308 | 12/1998 | Lauzon | 106/218 |
| 5,846,663 | 12/1998 | Brungardt et al. | 428/537.5 |
| 5,879,814 | 9/1999 | Bottorff | 428/537.5 |

FOREIGN PATENT DOCUMENTS

| | | |
|---|---|---|
| 0 629 741 A1 | 6/1994 | European Pat. Off. . |
| 58-91894 | 5/1983 | Japan . |
| 63-28997 | 2/1988 | Japan . |
| 4-19290 | 3/1992 | Japan . |
| 4-119194 | 4/1992 | Japan . |
| 1 504 853 | 3/1978 | United Kingdom . |
| 97/28311 | 8/1997 | WIPO . |
| 97/30218 | 8/1997 | WIPO . |
| 99/06219 | 11/1999 | WIPO . |

OTHER PUBLICATIONS

Hewlett Packard Paper Acceptance Criterafor HP Desk Jet 500C, 550C and 560C Printers, Hewlett–Packard Company, (Jul. 1, 1994).

J.P. Casey, Ed., Pulp and Paper Chemistry Chemical Technology, vol. 3, pp. 1553–1554 (1981).

Tapi Standard T530 pm–89 (1989).

Aqualon,*Natrosol, Hydroxymethylcellulose A Nonionic Water–Soluble Polymer, Physical and Chemical Properties*, pp. 1–20.

*Primary Examiner*—David Brunsman
*Attorney, Agent, or Firm*—Gary A. Samuels

[57] ABSTRACT

Compositions and methods useful stabilizing dispersions containing paper sizing agents are provided. The dispersions comprise a hydrophobically modified water-soluble polymer having a viscosity average molecular weight less than about 200,000. Dispersions containing sizing agents and other agents for treating paper can be made according to the methods of the invention.

34 Claims, No Drawings

COMPOSITIONS AND METHODS FOR PREPARING DISPERSIONS AND METHODS FOR USING THE DISPERSIONS

BACKGROUND OF THE INVENTION

The present invention relates to compositions and methods for preparing dispersions.

New printing processes such as ink jet printing have led to a demand for paper having specific properties while being useful for multiple purposes, such as reprographic copying, laser printing, ink jet printing, and the like. Specialty papers have been developed for each type of application, but as a practical matter, a multipurpose paper suitable for all such uses is desirable. In particular, ink jet printing demands that both ink and paper perform in such a way as to provide an acceptable image by wet printing, and acceptably rapid drying of the ink. Additives and agents, including sizing agents, are commonly used to impart to paper some of the properties needed for applications such as ink jet printing.

Paper is made with and/or surface treated with sizing agents primarily to prevent excess penetration, wicking or spread of water or ink. Many different types of nonreactive and reactive sizing agents are well known in the papermaking industry.

Sizing agents for paper are often provided in the form of aqueous dispersions. Such dispersions can contain one or more sizing agents, one or more salts, and one or more processing aids.

During use or during short-term storage, dispersions containing sizing agents and salts can stratify, resulting in an upper layer containing a higher than average concentration of the sizing agent and a lower layer containing a higher than average concentration of salts. This is a significant disadvantage because frequent or continuous agitation can be required in order to maintain a substantially uniform dispersion.

Stratification of liquid rosin sizes has been addressed in U.S. Pat. No. 2,873,203, the disclosures of which are hereby incorporated herein by reference in their entirety. The disclosed method for inhibiting stratification includes the addition to the rosin size of a small amount of sodium chloride, e.g., up to about 5% based on the total weight of solids in the size. However, the data indicate that although stratification can be eliminated for 2 days with the addition of up to 5% sodium chloride, the addition of more sodium chloride can lead to salting out of the sodium chloride rather than extension of the period during which stratification is prevented.

The present invention provides compositions and methods for forming dispersions that can remain substantially uniform during use and/or storage. The compositions and methods are useful in dispersions of materials such as sizing agents for paper.

SUMMARY OF THE INVENTION

One aspect of the present invention is a composition comprising a paper sizing agent and at least one hydrophobically modified water-soluble polymer having a viscosity average molecular weight of about 200,000 or less. In preferred embodiments, the hydrophobically modified water-soluble polymer has a viscosity average molecular weight of about 100,000 or less, more preferably about 50,000 or less. Also preferably, the hydrophobically modified water-soluble polymer has a viscosity average molecular weight of at least about 20,000, more preferably at least about 30,000. In certain highly preferred embodiments, the hydrophobically modified water-soluble polymer has a viscosity average molecular weight from about 30,000 to about 50,000.

In one embodiment of the invention, the hydrophobically modified water-soluble polymer is a hydrophobically modified cellulose ether. In preferred embodiments, the cellulose ether is substantially nonionic. Preferred cellulose ethers include methyl cellulose, hydroxypropyl cellulose, hydroxypropylmethyl cellulose, hydroxyethyl cellulose, and ethyl hydroxyethyl cellulose.

Hydrophobic modification can be imparted to a water soluble polymer in the compositions of the present invention, for example, in the form of side chains. Preferably, the hydrophobic modification of the water soluble polymer includes at least one alkyl side chain of at least about 8 carbon atoms, even more preferably at least one alkyl side chain of at least about 10 carbon atoms, still more preferably at least one alkyl side chain of at least about 12 carbon atoms. In certain highly preferred embodiments, the hydrophobic modification of the water soluble polymer is provided by at least one alkyl side chain of at least about 14 carbon atoms, 15 carbon atoms, or 16 carbon atoms. It is generally preferred that the hydrophobic modification of the polymer includes alkyl side chains of not more than about 24 carbon atoms, more preferably not more than about 22 carbon atoms, even more preferably not more than about 20 carbon atoms, and still more preferably not more than about 18 carbon atoms.

In some embodiments of the compositions of the present invention, the hydrophobically modified water soluble polymer is a cellulose ether having a degree of substitution of at least about 2.0. In preferred embodiments, the cellulose ether has a degree of substitution of at least about 3.0. In certain highly preferred embodiments, the cellulose ether has a degree of substitution of from about 3.5 to about 3.6.

Sizing agents useful according to the invention include reactive sizing agents and nonreactive sizing agents. Preferred reactive sizing agents include alkyl ketene dimers, alkenyl succinic anhydrides, alkenyl ketene dimers and alkyl or alkenyl ketene multimers. In preferred embodiments, reactive sizing agents are liquid at room temperature, and in highly preferred embodiments, the reactive sizing agents are alkenyl ketene dimers. Preferred nonreactive sizing agents include, for example, polymer emulsion sizing agents and rosin sizing agents.

Another aspect of the present invention is a substantially uniform dispersion, containing a paper sizing agent and at least one hydrophobically modified water-soluble polymer having a viscosity average molecular weight of about 200,000 or less. The sizing agent can be, for example, a reactive sizing agent or a nonreactive sizing agent, or a combination thereof. According to the invention, preferred reactive sizing agents include alkyl ketene dimers, alkenyl succinic anhydrides, alkenyl ketene dimers and alkyl or alkenyl ketene multimers. In preferred embodiments, reactive sizing agents are liquid at room temperature, and in highly preferred embodiments, the reactive sizing agents are alkenyl ketene dimers. Preferred nonreactive sizing agents include, for example, polymer emulsion sizing agents and rosin sizing agents.

A further aspect of the present invention is a dispersion containing a paper sizing agent, a hydrophobically modified water soluble polymer, and a salt. Exemplary salts include of halides of calcium, magnesium, and barium. In preferred embodiments, the salts include one or more salts selected from calcium chloride, magnesium chloride, magnesium bromide, calcium bromide, calcium nitrate, magnesium nitrate, calcium acetate, and magnesium acetate.

Another aspect of the present invention is a method for treating paper that includes adding to the paper, at or near the size press, a composition containing a paper sizing agent and a hydrophobically modified water soluble polymer. In preferred embodiments, the composition also contains a salt. Preferred salts include calcium chloride, magnesium chloride, magnesium bromide, calcium bromide, calcium nitrate, magnesium nitrate, calcium acetate, and magnesium acetate. For treating paper according to the invention, the hydrophobically modified water-soluble polymer preferably has a viscosity average molecular weight of about 100,000 or less, more preferably about 50,000 or less. Also preferably, the viscosity average molecular weight of the hydrophobically modified water soluble polymer is at least about 20,000, more preferably at least about 30,000. In certain highly preferred embodiments, the hydrophobically modified water-soluble polymer has a viscosity average molecular weight from about 30,000 to about 50,000.

In preferred embodiments for treating paper according to the invention, the water-soluble polymer is a cellulose ether. Preferably, the cellulose ether has a degree of substitution of at least about 2.0, more preferably at least about 3.0. In certain highly preferred embodiments, the cellulose ether has a degree of substitution of from about 3.5 to about 3.6. Also preferably, the hydrophobically modified cellulose ether is substantially nonionic. Preferred substantially nonionic, hydrophobically modified water soluble polymers include methyl cellulose, hydroxypropyl cellulose, hydroxypropylmethyl cellulose, hydroxyethyl cellulose, and ethyl hydroxyethyl cellulose.

In preferred embodiments, for treating paper according to the invention, the hydrophobic modification is imparted to the water soluble polymer by the presence in the polymer of at least one alkyl side chain of at least about 8 carbon atoms. Preferably, the water soluble polymer has at least one alkyl side chain of at least about 10 carbon atoms, even more preferably at least about 12 carbon atoms, still more preferably at least about 14 carbon atoms. In certain highly preferred embodiments, the hydrophobic modification of the water soluble polymer includes an alkyl side chain of at least about 15 or 16 carbon atoms. It is preferred, however, that the alkyl side chain have not more than about 24 carbon atoms, more preferably not more than about 22 carbon atoms, still more preferably not more than about 20 carbon atoms, and even more preferably not more than about 18 carbon atoms.

Another aspect of the present invention is a paper containing a hydrophobically modified water soluble polymer and a paper sizing agent. Preferably, the hydrophobically modified water-soluble polymer has a viscosity average molecular weight of about 100,000 or less, more preferably about 50,000 or less. It is also preferred that the hydrophobically modified water-soluble polymer has a viscosity average molecular weight of at least about 20,000, more preferably at least about 30,000. In certain highly preferred embodiments, the hydrophobically modified water-soluble polymer has a viscosity average molecular weight from about 30,000 to about 50,000.

Preferably, in paper according to the invention, the hydrophobically modified water-soluble polymer is a hydrophobically modified cellulose ether, and even more preferably the cellulose ether is substantially nonionic. Preferred cellulose ethers include methyl cellulose, hydroxypropyl cellulose, hydroxypropylmethyl cellulose, hydroxyethyl cellulose, and ethyl hydroxyethyl cellulose.

In preferred embodiments in paper, hydrophobic modification is imparted to the water soluble polymer by the presence in the polymer of at least one alkyl side chain of at least about 8 carbon atoms. Preferably, the water soluble polymer has at least one alkyl side chain of at least about 10 carbon atoms, even more preferably at least about 12 carbon atoms, still more preferably at least about 14 carbon atoms. In certain highly preferred embodiments, the hydrophobic modification of the water soluble polymer includes an alkyl side chain of at least about 15 or 16 carbon atoms. It is preferred, however, that the alkyl side chain have not more than about 24 carbon atoms, more preferably not more than about 22 carbon atoms, still more preferably not more than about 20 carbon atoms, and even more preferably not more than about 18 carbon atoms.

These and other aspects of the invention will be apparent to one skilled in the art in view of the following disclosure and the appended claims.

DETAILED DESCRIPTION OF THE INVENTION

It has been surprisingly and unexpectedly discovered that the uniformity and storage stability of dispersions can be improved by incorporating into the dispersions one or more polymeric materials having particular characteristics.

Improvement of dispersions, according to the present invention, includes maintaining substantial uniformity of a dispersion. The term “substantially uniform”, as used herein, means that a composition has minimal or no detectable variation in the distribution of components throughout the volume of the composition. For example, a substantially uniform dispersion has minimal variation in the concentration of its components over the volume of the dispersion. Preferably, a substantially uniform composition has less than about 5% variation in concentration of each component throughout the dispersion, and no variations are detectable upon visual inspection. Thus, for example, in certain preferred embodiments, the concentration of a particular component in a substantially uniform dispersion might vary from about 10.0% to about 10.5% at different locations within the total volume of the composition, and such variation will be undetectable upon visual inspection.

The compositions and methods of the present invention also can improve the storage stability of dispersions. Improvement of storage stability of a dispersion, for purposes of the present disclosure, includes increasing the storage and/or use time over which the dispersion remains substantially uniform. Improvement of stability of a dispersion also includes increasing the storage and/or use time over which substantially no stratification is observed upon visual inspection.

The compositions and methods of the present invention are particularly useful for improving or maintaining the uniformity of pre-mixed additives for paper that are typically stored for some time prior to application to the paper. Thus, the compositions and methods of the present invention are particularly applicable to dispersions of sizing agents. The compositions of the present invention can also contain pigments, defoamers, optical brightening agents and other additives useful for treating paper.

“Improved storage stability”, as used herein, means that stratification of a dispersion during storage or use is delayed, reduced, or eliminated. Therefore, improved storage stability can be determined by measuring the time elapsed before onset of stratification in a dispersion during storage. In accordance with the use of the compositions and methods of the present invention, it is expected that substantially no stratification will be detected in a dispersion upon visual inspection after storage for at least about 7 days, preferably at least about 14 days, more preferably at least about 21 days and even more preferably at least about 28 days. The absence of visibly observable stratification in dispersions will typically persist for the recited time periods at ambient temperatures, such as a temperature of at least about 25° C., preferably at least about 28° C., more preferably at least about 30° C., and still more preferably at least about 32° C.

The time period during which no onset of stratification is observed will generally increase with increased concentration of the hydrophobically modified polymer. An upper limit of concentration of the hydrophobically modified polymer is determined, in part, by the effects of the polymer on certain properties of the dispersion, and the importance of each property for the intended application. Specific properties affected by the polymer include viscosity and hydrophobicity. Viscosity can have a significant effect on the handling of the dispersion. As a general guideline, the practical upper limit of the amount of polymer is typically reached when the hydrophobically modified polymer forms about 10 weight percent of the solids content of the dispersion. For example, the amount of polymer can be from about 1% to about 10%, based on the total weight of the solids, more typically from about 1 % to about 5 %. As a percentage of the total weight of the dispersion, the amount of hydrophobically modified polymer is preferably at least about 0.2%, more preferably at least about 0.4%, and even more preferably at least about 0.5%. The amount of hydrophobically modified polymer is preferably about 3% or less, more preferably about 2% or less, and even more preferably about 1.5% or less. The practical upper limit of the amount of hydrophobically modified polymer is determined, in part, by the acceptable upper limit of viscosity of the dispersion for its intended use. Other factors which can affect the practical upper limit of polymer content include the effect of increased polymer content on properties desirable for a particular end use, such as print quality of paper.

Certain polymers having the characteristics, disclosed herein, making them suitable for use in the compositions and methods of the present invention are known to those skilled in the art as "associative thickeners". Associative thickeners generally contain a hydrophilic backbone and hydrophobic moieties that are generally present as side groups. The hydrophobic moieties can be localized, or dispersed along the backbone. Examples of hydrophobic moieties are long chain alkyl groups such as dodecyl, hexadecyl, and octadecyl, and alkylaryl groups such as octylphenyl and nonylphenyl. Examples of associative thickeners are disclosed in U.S. Pat. No. 5,425,806, the disclosures of which are incorporated herein by reference in their entirety. Although associative thickeners have physical properties that render them useful in the compositions and methods of the present invention, it will be appreciated by one skilled in the art, in view of the present disclosure, that polymers which provide improved uniformity and/or stability of dispersions according to the present invention are not required to affect the viscosity properties of dispersions.

Polymers useful in the methods and compositions of the present invention are hydrophobically modified water soluble or water dispersible polymers. By way of example, polymers useful in the compositions and methods of the present invention include hydrophobically modified polyacrylates, hydrophobically modified polyurethanes, hydrophobically modified polyethers, hydrophobically modified alkali soluble emulsions, hydrophobically modified cellulosic polymers including nonionic cellulose ethers, polyether-polyols, and hydrophobically modified polyacrylamides.

Hydrophobic modification of water soluble polymers can be imparted by the presence of hydrophobic moieties on the polymers. The hydrophobic moieties are preferably alkyl groups, present as alkyl side chains on the backbone of the polymer. Preferred alkyl side chains are alkyl groups having a hydrocarbon chain of at least about 8 carbon atoms, referred to herein as $C_8$ alkyl groups. More preferred are alkyl groups having at least about 12 carbon atoms in a chain, and still more preferred are alkyl groups having at least about 14 carbon atoms. Preferably, the alkyl groups having about 24 carbon atoms or fewer, more preferably about 20 carbon atoms or fewer, still more preferably about 18 carbon atoms or fewer. $C_{15}$ and $C_{16}$ alkyl groups are particularly preferred.

The hydrophobic moieties are preferably present in the polymers at about 1 to 2 weight percent, more preferably about 1.3 to 1.8 weight percent, even more preferably about 1.4 to 1.7 weight percent, and still more preferably about 1.5 to 1.6 weight percent, based on the total weight of the polymer. When the hydrophobic moiety is a $C_{16}$ alkyl group, about 1.6 weight percent alkyl group based on the total weight of the polymer is highly preferred. Preferably, after such hydrophobic modification, the hydrophobically modified polymers are at least about 1% by weight soluble in water.

Suitable polymers include hydrophobically modified cellulose ethers, such as those described in U.S. Pat. No. 4,228,277, the disclosures of which are hereby incorporated herein by reference. Preferred hydrophobically modified polymers are cellulose ethers that are substantially nonionic. The term "nonionic", as used herein in connection with cellulose ethers, refers to the absence of net ionic charge in the polymer repeat unit, even though there may be present in the polymer one or more ionic groups. The nonionic character of a cellulose ether is derived, in part, from the nature of substituent groups on the anhydroglucose rings of the cellulose. Nonionic substituents imparting a substantially nonionic character to a cellulosic polymer include alkyl groups such as, for example, methyl, ethyl, hydroxyethyl, and hydroxypropyl. It is preferred that cellulose ethers for use in the present invention have a degree of nonionic substitution of at least about 2.0, more preferably at least about 3.0, with an upper limit at that degree of substitution at which the water solubility of the polymer is at least about 1 percent. The degree of substitution refers to the number of substituted sites on the anhydroglucose ring. Such nonionic substitution is preferably in the form of a group selected from methyl, hydroxyethyl, and hydroxypropyl. Preferably the degree of nonionic substitution, such as hydroxyethyl substitution, is from about 3.5 to 3.6. Hydrophobically modified hydroxy alkyl cellulose polymers, such as hydrophobically modified methyl cellulose, hydrophobically modified hydroxypropyl cellulose, hydrophobically modified hydroxypropylmethyl cellulose, hydrophobically modified hydroxyethyl cellulose, and hydrophobically modified ethyl hydroxyethyl cellulose, and others disclosed in U.S. Pat. No. 4,228,277, are highly preferred, with hydrophobically modified hydroxy ethyl cellulose being particularly preferred.

Preferably, the hydrophobically modified water soluble polymers for use in the present invention have a viscosity average molecular weight of about 200,000 or less, more preferably about 100,000 or less, still more preferably about 50,000 or less. The hydrophobically modified water soluble polymers preferably have a viscosity average molecular weight of at least about 20,000, more preferably at least about 30,000. In certain highly preferred embodiments, the hydrophobically modified water soluble polymers have a viscosity average molecular weight from about 30,000 to about 50,000.

The quantity of polymer required to achieve the desired improvement in uniformity, as indicated by the reduction of stratification or the delay in onset of stratification, in dispersions prepared according to the present invention, is determined in part by the composition of the dispersion. Typically, in a dispersion containing about 30% solids, of which about 12% solids are due to sizing agent and about 18% due to salt, the amount of hydrophobically modified polymer in the dispersion is at least about 0.3 weight percent. Preferably, the amount of polymer is at least about 0.5 weight percent, and more preferably at least about 0.7 weight percent. Also preferably, the amount of polymer is about 2.0 weight percent or less, more preferably about 1.5 weight percent or less, even more preferably about 1.3 weight percent or less. In certain highly preferred embodiments, the amount of polymer is from about 0.7 to about 1.3 weight percent.

The methods of the present invention are useful for forming dispersions of a wide variety of materials in aqueous media. The methods of the present invention are particularly useful in forming dispersions of agents useful in treating cellulose fibers. Such agents include those useful in treating textiles, carpet fibers, and paper. "Paper", as used herein, includes sheets or webs of fibrous materials consisting mainly of cellulose fibers. Such sheets or webs can be relatively thin, or can be thicker board-like materials such as paperboard, cardboard, and the like. Cellulose fibers from which the paper is made can be from a variety of sources including softwoods, hardwoods, straw, papyrus, flax, jute and others. Although synthetic fibers can also be present, for purposes of the present invention, paper to be treated with dispersed agents is preferably substantially totally made from non-synthetic cellulosic fibers.

In particular, the methods and compositions of the present invention are useful for dispersions containing sizing agents. Dispersions containing sizing agents, for use according to the present invention, preferably contain at least about 5% of one or more sizing agents, more preferably at least about 8%, and even more preferably at least about 10%. The maximum amount of sizing agent is preferably about 20% or less, more preferably about 15% or less. All quantities expressed as percentages in this disclosure are by weight based on the total weight of the solution, mixture, composition, or paper, as appropriate, unless otherwise noted.

Different types of sizing agents can be used for paper, determined in part by the conditions under which the paper is made. Thus, compositions used for treating paper can contain nonreactive sizing agents including dispersed rosin sizing agents, reactive sizing agents, and combinations or mixtures of sizing agents. For papermaking carried out under alkaline pH manufacturing conditions, sizing agents based on alkyl ketene dimers (AKDs), alkenyl succinic anhydride (ASA) sizing agents, and sizing agents based alkenyl ketene dimers or multimers, are preferred. Suitable reactive and nonreactive sizing agents are known to those skilled in the art, and are disclosed in U.S. patent application Ser. No. 09/126,643, the disclosures of which are hereby incorporated herein by reference in their entirety.

Examples of nonreactive sizing agents include polymeric emulsion sizing agents such as, for example, BASOPLAST® 335D nonreactive polymeric surface size emulsion from BASF Corporation (Mt. Olive, N.J.), FLEXBOND® 325 emulsion of a copolymer of vinyl acetate and butyl acrylate from Air Products and Chemicals, Inc. (Trexlertown, Pa.); and PENTAPRINT® nonreactive sizing agents from Hercules Incorporated (Wilmington, Del.).

Reactive sizing agents include ketene dimers and multimers that are liquid at room temperature, such as alkenyl ketene dimers and multimers. Reactive sizing agents have a reactive functional group that is capable of covalently bonding to cellulose fiber in the paper and hydrophobic tails that tend to orient away from the fiber, imparting water repellency to the fiber. In the compositions and methods of the present invention, reactive sizing agents are preferably in liquid form; i.e. the compositions of the present invention can comprise liquid reactive sizing agents within a dispersion.

Ketene dimers are well known for use as paper sizing agents. AKDs, which contain one β-lactone ring, are typically prepared by the dimerization of alkyl ketenes made from two fatty acid chlorides. Commercially available alkyl ketene dimer sizing agents prepared from palmitic and/or stearic fatty acids include, e.g., Hercon® and Aquapel® sizing agents (both from Hercules Incorporated, Wilmington, Del.). AKD sizing agents and their use are disclosed, for example, in U.S. Pat. No. 4,017,431, the disclosures of which are hereby incorporated herein by reference in their entirety. Uses of paper made under alkaline conditions are described in U.S. Pat. No. 5,766,417 the disclosures of which are hereby incorporated herein by reference in their entirety.

Commercially available alkenyl ketene dimer sizing agents include, e.g., Precis® sizing agents (Hercules Incorporated, Wilmington, Del.). Similarly, ketene multimers, which contain more than one β-lactone ring, can be employed as paper sizing agents. Ketene multimers prepared from a mixture of mono- and dicarboxylic acids are disclosed as sizing agents for paper in U.S. Pat. No. 5,725,731; U.S. patent applications Ser. Nos. 08/601,113 (now U.S. Pat. No. 5,846,663) and 08/996,855; and PCT patent application no. 96/12172 (WO97/30218), the disclosures of each of which are hereby incorporated herein by reference in their entirety. Alkyl ketene dimer and multimer mixtures as sizing agents for use in high speed converting and reprographic machines are disclosed in European Patent Application Publication No. 0 629 741 A1. The disclosed alkyl ketene multimers are made from the reaction of a molar excess of monocarboxylic acid, typically a fatty acid, with a dicarboxylic acid, and are solids at 25° C. Other alkaline sizing agents are disclosed in U.S. Pat. No. 5,685,815, the disclosures of which are hereby incorporated herein by reference in their entirety.

Paper typically made under acidic paper making conditions, referred to as acid paper, is usually sized with well-known rosin-derived sizing agents (also referred to herein as "dispersed rosin sizing agents"), which are nonreactive sizing agents. Some papers made under neutral and alkaline paper making conditions can be sized with dispersed rosin sizing agents. Dispersed rosin sizing agents are well known to those skilled in the paper making industry. Rosins useful as dispersed rosin sizing agents include unfortified rosin, fortified rosin and extended rosin, as well as rosin esters, and mixtures and blends thereof. Thus, the term "rosin" is used herein to include all forms of dispersed rosin useful in a sizing agent. Suitable rosin sizing agents include those disclosed in U.S. Pat. Nos. 3,966,654 and 4,263,182, the disclosures of each of which are hereby incorporated herein by reference in their entirety. Fortified rosins include adduct reaction products of a rosin and an acidic compound containing an α, β-unsaturated carbonyl group. Methods of preparing fortified rosin are well known to those skilled in the art and are disclosed in, for example, U.S. Pat. Nos. 2,628,918 and 2,684,300, U.S. patent application Ser. No. 09/046,019, (now U.S. Pat. No. 5,846,308) and PCT Patent Application No. 97/01274 (WO97/28311), the disclosures of each of which are hereby incorporated herein by reference in their entirety. Other suitable rosins that can be used in the methods of the present invention include rosin esters. Examples of suitable rosin esters include those disclosed in U.S. Pat. Nos. 4,540,635 and 5,201,944, the disclosures of which are hereby incorporated herein by reference. Rosin sizing agents can be extended, if desired, by known extenders therefor such as waxes (particularly paraffin wax and microcrystalline wax); hydrocarbon resins including those derived from petroleum hydrocarbons and terpenes; and the like.

Hydrophobic acid anhydrides useful as sizing agents for paper include those disclosed, for example, in U.S. Pat. No. 3,582,464, the disclosures of which are hereby incorporated herein by reference in their entirety. Other suitable paper sizing agents include hydrophobic organic isocyanates, such as, for example, alkylated isocyanates, alkyl carbamoyl chlorides, alkylated melamines such as stearylated melamines, and styrene acrylates. If desired, combinations of paper sizing agents can be employed.

Salts useful in forming dispersions of sizing agents include divalent metallic salts that are soluble in aqueous media, in amounts typically used in an aqueous sizing medium. Suitable metallic salts are preferably soluble in aqueous media having a pH from about 7 to about 9, which includes the pH of an aqueous sizing medium generally used in a size press. Exemplary metallic salts include halides of calcium, magnesium, barium and the like. Preferred metallic salts are mineral or organic acid salts of divalent cationic metal ions. Suitable divalent metallic salts calcium chloride, magnesium chloride, magnesium bromide, calcium bromide, barium chloride, calcium nitrate, magnesium nitrate, calcium acetate, and magnesium acetate. Calcium and magnesium chlorides are preferred. The use of divalent metallic salts in forming dispersions of paper sizing agents is disclosed in U.S. patent application Ser. No. 09/126,643, already incorporated herein by reference. Methods of preparation of dispersions of sizing agents, compatibility of additives and other conditions and equipment may be selected in accordance with conventional practices of those skilled in the art, in view of the requirements of compatibility and performance for a particular application. As will be recognized by those skilled in the art, mixtures that produce coagulation and/or precipitation that can interfere with paper production are generally not suitable.

The use of additives known to those skilled in the art for improving ink jet printing is within the scope of the present invention. Additives that can optionally be present in the dispersions include polyvinyl alcohol, polyvinylpyrrolidone, and polyethyleneimine. Surface treatment additives can optionally be used, including latex emulsions conventionally used as paper additives. The amount of additives in the sizing composition can be, for example, from about 0.01% to about 3%, and varies with the type of additive and the amount of solution picked up by the paper during size press treatment.

According to the invention, dispersions can generally be prepared using methods known to those skilled in the art. However, it is preferred that all components of the dispersion except the hydrophobically modified polymers of the invention be combined before a hydrophobically modified polymer is added. It is also preferred that a solution of the hydrophobically modified polymer is made, and the solution then added to the other components of the dispersion. Such solution can be made in any suitable aqueous medium, such as, for example, water or a dilute aqueous salt solution such as dilute calcium chloride solution. The addition of the solution to the remaining combined components of the dispersion is preferably accomplished with agitation.

Compositions of the present invention that contain sizing agents, including the sizing agents disclosed herein, are useful in treating cellulose fibers and substrates containing cellulose fibers. Examples of substrates for which compositions of the present invention, including those containing sizing agents, are useful include paper; wood, wood chips, paperboard, nonwoven fabrics containing cellulose fibers, and substrates containing processed cellulose such as fiberboard.

Paper sizing compositions containing compositions of this invention may be applied to the surface of the paper or other substrate by any of several different conventional means, well known in the paper making arts. Alternatively, the sizing agents can be applied as internal sizing agents and added to paper pulp slurry before sheet formation. In surface sizing treatments, a sizing composition is generally applied as a surface treatment to both sides of the paper being treated, but if desired, surface application could be made to only one side of the paper sheet.

A preferred method of application uses a conventional metered or nonmetered size press in a conventional paper making process. When this technique is used, the application temperature is at least about 50° C. and not greater than about 80°, typically about 60° C., and the composition comprising a sizing agent is applied at or near the size press. However, the invention is not limited to treatment of the paper or other substrate via the size press treatment or at the temperature typically used at the size press, since the substrate can also be treated with the composition by other methods known to those skilled in the art.

Various modifications of the invention, in addition to those described herein, will be apparent to those skilled in the art from the foregoing description. Such modifications are intended to fall within the scope of the appended claims.

The disclosures of each patent, patent application, and publication cited or described in this document are hereby incorporated herein by reference in their entirety.

EXAMPLES

The following examples are merely illustrative of the present invention and should not be considered limiting of the scope of the invention in any way. These examples and equivalents thereof will become more apparent to those skilled in the art in light of the present disclosure and the accompanying claims.

All percentages used in the following examples are by weight unless otherwise noted.

In the Examples described below, where paper was tested, the paper was passed through a laboratory puddle size press and the desired treatment applied. The treated paper was then immediately dried on a drum drier. The paper was conditioned for a minimum of 24 hours before ink jet testing. In all of the examples below the ink jet printing was conducted with the Hewlett-Packard DeskJet 660C ink jet printer. The print settings were set on "best" and "plain paper" within the Hewlett-Packard software that was supplied with the printer. The print characteristics of the paper were measured at least 1 hour after printing. Optical density readings were made with a Cosar model 202 densitometer. Print characteristics were evaluated using a test pattern with solid color areas, black text print, and black-on-yellow and yellow-on-black printed areas. A method of evaluation is described in Hewlett-Packard test criteria. The ratings listed on a scale of good, fair and poor are based on the Hewlett-Packard ratings of good, acceptable and unacceptable. See, e.g., *Hewlett Packard Paper Acceptance Criteria for HP Desk Jet 500C, 550C and 560C Printers*, Hewlett-Packard Company, Jul. 1, 1994.

In some examples, the sizing of the paper was measured by the Hercules Sizing Test (HST). The Hercules Sizing Test is a well-recognized test for measuring sizing performance and is described in J. P. Casey, Ed., *Pulp and Paper Chemistry and Chemical Technology*, Vol. 3, pp. 1553–1554 (1981) and in TAPPI Standard T530, the disclosures of which are hereby incorporated herein by reference in their entirety. A higher HST number is considered to represent better sizing ability (less water penetration).

Starch solutions were prepared by cooking the starch in water at about 95° C. for 30 to 60 minutes and then adjusting the pH to about 8. The components noted in the Examples were mixed into the starch. The mixtures were stirred and the pH was adjusted as noted in the Examples below. Within about 10 minutes of adding the materials to the starch mixtures, the mixtures were applied to the paper prepared as described above. The basis weight of the paper used was in all cases about that of normal copy paper, or 75 g/$m^2$.

Example 1

To 46.2 g of Hercules Precis 2000 sizing agent (P 2000; 26% solids) 23.4 g of Dow Flake calcium chloride dihydrate (77% solids) from Dow Chemical was slowly added, with stirring. A 4% solution of hydrophobically modified hydroxyl ethyl cellulose was prepared by slowly adding the polymer to water and stirring for 2 hours. The hydrophobically modified hydroxy ethyl cellulose had a viscosity average molecular weight of 30,000–50,000, a degree of hydroxy ethyl substitution of 3.5–3.6, and 1.6 weight percent $C_{16}$ side chains. The solution was then allowed to sit for about 1 day and then stirred to further bring the polymer into solution.

The calcium chloride/P2000 mix, the solution of hydrophobically modified hydroxy ethyl cellulose, and water were combined in separate four ounce glass jars, in the ratios listed in Table 2. The height of the combined solution in each jar was 53 mm. The jars of solution were placed in a 32° C. bath for 4 weeks. The solutions were visually examined for stratification at various times during the four weeks. Stratification was quantified by measuring the height of the clear area at the bottom of each jar. The results are recorded in Table 3.

TABLE 2

Solutions used in Example 1

| Sample | CaCl2/P2000 mixture (g) | cellulose polymer Solution (g) | water (g) |
|---|---|---|---|
| A | 69.6 | 0 | 30.4 |
| B | 69.6 | 26.3 | 4.1 |
| C | 69.6 | 30.0 | 0.4 |

TABLE 3

Stratification of Solutions as Indicated by Height of Clear Area at Bottom of Jar

| Sample | 7 days | 14 days | 21 days | 28 days |
|---|---|---|---|---|
| A | <1 | 1 | 4 | 5 |
| B | 0 | 0 | <1 | <1 |
| C | 0 | 0 | 0 | 0 |

The results indicate that addition of the modified hydroxy ethyl cellulose slowed the rate of stratification of the solutions. At a level of 1.2% polymer in the samples (sample C) there was essentially no stratification after 4 weeks at 32° C.

Example 2 (Comparative Example)

In this example, polymers that were not hydrophobically modified were added to solutions of sizing agent, and stratification was measured.

To a 30% solids mixture (18% solids due to CaCl2 and 12% solids due to P2000 sizing agent) the materials listed in Table 4 were added using the procedure of Example 1. The form in which the materials were added and the amount added are listed in Table 4. Samples of 100 g of each mixture were each placed in a four oz. glass jar. The height of the samples in each jar was 53 mm. The jars were placed in a 32° C. bath for 4 weeks. The samples were visually examined for stratification over a period of four weeks. The height of the clear area at the bottom of the jars was measured to determine the onset of stratification. The results are recorded in Table 5.

TABLE 4

Additives used in Example 2

| Sample | additive | form of additive | % additive in final mixture |
|---|---|---|---|
| 2A | — | — | 0 |
| 2B | CMHEC | 1% solution | 0.025 |
| 2C | HMHEC | 1% solution | 0.125 |
| 2D | HMHEC | 1% solution | 0.50 |
| 2E | PVA | 3% solution | 0.50 |

CMHEC = CMHEC 420H carboxy methyl hydroxy ethyl cellulose from Hercules Inc.
HMHEC = Natrosol Plus 330 hydroxy methyl hydroxy ethyl cellulose from Hercules Inc.
PVA = Airvol 540S polyvinyl alcohol from Air Products

TABLE 5

(Example 2)
Stratification as Indicated by Height
Of Clear Area at Bottom of Jar

| Sample | Stratification (mm) after indicated number of days in 32° C. bath | | | | |
|---|---|---|---|---|---|
| | 5–7 | 11–13 | 19–21 | 28 | 43–48 |
| 2A | 0 | | 3 | 6 | 9 |
| 2B | 2 | | 17 | | |
| 2C | | 2 | 4 | 6 | |
| 2D | | 2 | | 6 | |
| 2E | 5 | | | | 11 |

The results show that none of the polymeric additives listed in Table 4 significantly delayed the onset of stratification of the solutions, and that with CMHEC and polyvinyl alcohol an increase in stratification was observed.

Example 3

A 3% solution of hydroxyl ethyl cellulose having a viscosity average molecular weight of 30,000–50,000, a degree of hydroxy ethyl substitution of 3.5–3.6, and 1.6 weight percent $C_{16}$ side chains) was prepared by slowly adding the polymer to water and stirring for 2 hours. The solution was allowed to sit for about 1 day. Calcium chloride dihydrate and water were added to form solutions as in Example 1. Four separate samples were prepared by adding P2000 sizing agent in the amounts specified in Table 6. The samples were each placed in a four oz. glass jar. The height of the sample in each jar was 53 mm. The samples were placed in a 32° C. bath for 4 weeks, and were visually examined for stratification at various times during the four weeks. The height of the clear area at the bottom of the jars was measured to determine stratification. The results are shown in Table 7.

TABLE 6

| Sample | CaCl2 (g) | polymer (g) | water (g) | P2000 sizing agent (g) | final HMP % Solids |
|---|---|---|---|---|---|
| A | 23.9 | 0 | 30.0 | 46.2 | 0 |
| B | 23.9 | 16.7 | 13.3 | 46.2 | 0.5 |
| C | 23.9 | 23.3 | 6.7 | 46.2 | 0.7 |
| D | 23.9 | 30.0 | 0 | 46.2 | 0.9 |

TABLE 7

Stratification as Indicated by Height
Of Clear Area at Bottom of Jar

| Sample | Stratification after indicated number of days in bath | | | |
|---|---|---|---|---|
| | 7 days | 14 days | 21 days | 28 days |
| A | 1–2 | 4 | 4 | 6 |
| B | 1 | 2 | 3 | 4 |
| C | <1 | 2 | 3 | 3 |
| D | 0 | <1 | <1 | 3 |

The results indicate that the addition of the hydrophobically modified cellulose polymer slowed stratification, and the amount of stratification was reduced with increasing amounts of polymer.

Example 4

This example illustrates the effect of increasing the quantity of hydrophobically modified cellulose polymer on the stratification of a 20%-solids dispersion of sizing agent.

A 3% solution of polymer was prepared as in Example 3. The solution was allowed to stand for about 1 day. Calcium chloride dihydrate and P2000 sizing agent were added in the amounts specified in Table 8. The resulting sample solutions were each placed in a four oz. glass jar. The height of the samples in each jar was 53 mm. The jars were placed in a 32° C. bath for 4 weeks, and were visually examined for stratification over the four weeks. The height of the clear area at the bottom of the jars was measured. The results are recorded in Table 9.

TABLE 8

Solutions Used in Example 4

| Sample | $CaCl_2*2H_2O$ | HMP[1] Soln (g) | water (g) | P2000 | final HMP %[2] |
|---|---|---|---|---|---|
| A | 15.9 | 0 | 53.3 | 30.8 | 0 |
| B | 15.9 | 11.1 | 42.2 | 30.8 | 0.33 |
| C | 15.9 | 20.0 | 33.3 | 30.8 | 0.60 |
| D | 15.9 | 44.4 | 8.9 | 30.8 | 1.33 |
| E | 15.9 | 53.3 | 0 | 30.8 | 1.60 |

[1]HMP = hydrophobically modified polymer
[2]amount of polymer as weight percent of a 20% solids dispersion, based on total weight of the dispersion.

TABLE 9

Stratification as Indicated by Height in mm
Of Clear Area at Bottom of Jar

| Sample | 7 days | 14 days | 21 days | 28 days |
|---|---|---|---|---|
| A | 1–2 | 4 | 4 | 6 |
| B | 2 | 4 | 4 | 5 |
| C | <1 | 2 | 2 | 4 |
| D | 0 | <1 | <1 | <1 |

The results indicate that increasing the amount of polymer in the dispersion slowed the stratification.

Example 5

The dispersions prepared in Example 1 were used to treat paper as described above and disclosed in U.S. patent application Ser. No. 09/126,643. Each dispersion was treated with two levels of dry surface additive: 3 pounds (#) and 5 pounds of additive (P2000+$CaCl_2$+HMP) per ton of paper in its final, dried state. Starch was used as a carrier for the surface additives.

Sizing was evaluated with the standard Hercules Sizing Test (HST) in the same manner as described in U.S. patent application Ser. No. 09/126,643. A higher HST number indicates better sizing (less water penetration).

The base sheet treated was sized internally with a Hercules dispersed rosin sizing agent. The resulting sizing data are listed in Table 10.

TABLE 10

Effect of cellulose polymer on surface sizing of an acid base sheet

| SAMPLE (Designations refer To Example 1) | HST (seconds) |
|---|---|
| Starch only | 88 |
| 3#/ton sample A | 78 |
| 5#/ton sample A | 135 |
| 3#/ton sample B | 76 |

TABLE 10-continued

Effect of cellulose polymer on surface sizing of an acid base sheet

| SAMPLE (Designations refer To Example 1) | HST (seconds) |
|---|---|
| 5#/ton sample B | 129 |
| 3#/ton sample C | 188 |
| 5#/ton sample C | 196 |

The data show that the addition of 1% of hydrophobically modified cellulose polymer had no detectable effect on the sizing over the acid base sheet. The addition of 1.2% hydrophobically modified cellulose polymer (sample C) significantly improved sizing.

Example 6

This example illustrates the effect of hydrophobically modified cellulose polymer on sizing and ink jet print quality of paper.

The same materials and procedures used in example 5 were also used in this example. Sample letters A, B and C refer to the solutions described in Example 1. A different base sheet was treated. The base sheet was made under alkaline conditions and contained alkyl succinic anhydride as an internal sizing agent. Sizing and ink jet data were obtained.

Printing was done with a Hewlett Packard™ Desk Jet 660C printer. The print settings were "best" and "plain paper" as provided by the Hewlett-Packard software that was supplied with the printer. The print characteristics of the paper were determined at least 1 hour after printing. Optical density readings were made with a Cosar model 202 densitometer. Print characteristics were evaluated using a test pattern with solid color areas, black text print, and black-on-yellow and yellow-on-black printed areas. A procedure for evaluation is described in Hewlett-Packard test criteria. The ratings listed on a scale of good, fair and poor correspond to the Hewlett-Packard ratings of good, acceptable and unacceptable. See, e.g., *Hewlett Packard Paper Acceptance Criteria for HP Desk Jet* 500*C,* 550*C and* 560*C Printers*, Hewlett-Packard Company, Jul. 1, 1994.

TABLE 11

Effect of cellulose polymer on surface sizing of an alkaline base sheet

| SAMPLE (See Example 1) | HST (seconds) |
|---|---|
| Starch only | 4 |
| 3#/ton sample A | 235 |
| 5#/ton sample A | 321 |
| 3#/ton sample B | 129 |
| 5#/ton sample B | 238 |
| 3#/ton sample C | 128 |
| 5#/ton sample C | 167 |

TABLE 12

Effect of cellulose polymer on black ink jet printing of an alkaline base sheet

| SAMPLE (See Example 1) | Black OD | Black Line Growth | Black Edge Roughness |
|---|---|---|---|
| Starch only | 1.50 | f–g* | f–g |
| 3#/ton sample A | 1.68 | g | g |
| 4#/ton sample A | 1.69 | g | g |
| 3#/ton sample B | 1.68 | g | g |
| 5#/ton sample B | 1.69 | g | g |
| 3#/ton sample C | 1.65 | g | f–g |
| 5#/ton sample C | 1.67 | g | g |

*"f" indicates "fair"; "g" indicates "good" print quality

TABLE 13

Effect of cellulose polymer on black/color ink jet printing of an alkaline base sheet

| SAMPLE (See Example 1) | Black/Yellow Line Growth | Black/Yellow Edge Roughness |
|---|---|---|
| Starch only | f | f |
| 3#/ton sample A | g | f–g |
| 5#/ton sample A | g | f–g |
| 3#/ton sample B | f–g | f–g |
| 5#/ton sample B | g | f–g |
| 3#/ton sample C | g | f–g |
| 5#/ton sample C | f–g | f |

As indicated in Example 1, the amount of hydrophobically modified polymer in sample C is greater than that in sample B, and sample A contains no hydrophobically modified polymer. The results in Table 11 indicate that the sizing efficiency decreases slightly as hydrophobically modified polymer content is increased, and the decrease is more apparent at the 5#/ton surface treatment level. Thus, the results show how the appropriate upper limit of hydrophobically modified polymer for a given application can depend upon its effect on other desirable properties.

The results also indicate that the surface treatments enhanced the quality of ink jet printing as compared to the use of starch alone, with the exception of the effect of 5#/ton of sample C on black/yellow edge roughness.

Various modifications of the invention, in addition to those described herein, will be apparent to those skilled in the art from the foregoing description. Such modifications are intended to fall within the scope of the appended claims.

What is claimed is:

1. A paper sizing composition comprising a paper sizing agent and at least one hydrophobically modified water-soluble polymer having a viscosity average molecular weight of about 200,000 or less.

2. The composition of claim 1 wherein the hydrophobically modified water-soluble polymer has a viscosity average molecular weight of about 100,000 or less.

3. The composition of claim 1 wherein the hydrophobically modified water-soluble polymer has a viscosity average molecular weight of about 50,000 or less.

4. The composition of claim 1 wherein the hydrophobically modified water-soluble polymer has a viscosity average molecular weight of at least about 20,000.

5. The composition of claim 4 wherein the hydrophobically modified water-soluble polymer has a viscosity average molecular weight from about 30,000to about 50,000.

6. The composition of claim 1 wherein the hydrophobically modified water-soluble polymer has a viscosity average molecular weight of at least about 30,000.

7. The composition of claim 1 wherein the hydrophobically modified water-soluble polymer is a hydrophobically modified cellulose ether.

8. The composition of claim 7 wherein the cellulose ether is substantially nonionic.

9. The composition of claim 8 wherein the cellulose ether is hydroxy ethyl cellulose.

10. The composition of claim 7 wherein the cellulose ether is selected from the group consisting of methyl cellulose, hydroxypropyl cellulose, hydroxypropylmethyl cellulose, hydroxyethyl cellulose, and ethyl hydroxyethyl cellulose.

11. The composition of claim 7 wherein the cellulose ether has a degree of substitution of at least about 2.0.

12. The composition of claim 7 wherein the cellulose ether has a degree of substitution of at least about 3.0.

13. The composition of claim 7 wherein the cellulose ether has a degree of substitution of from about 3.5 to about 3.6.

14. The composition of claim 1 wherein the hydrophobic modification of the water soluble polymer comprises at least one alkyl side chain of at least about 8 carbon atoms.

15. The composition of claim 1 wherein the hydrophobic modification of the water soluble polymer comprises at least one alkyl side chain of at least about 10 carbon atoms.

16. The composition of claim 1 wherein the hydrophobic modification of the water soluble polymer comprises at least one alkyl side chain of at least about 12 carbon atoms.

17. The composition of claim 1 wherein the hydrophobic modification of the water soluble polymer comprises at least one alkyl side chain of at least about 14 carbon atoms.

18. The composition of claim 1 wherein the hydrophobic modification of the water soluble polymer comprises at least one alkyl side chain of at least about 15 carbon atoms.

19. The composition of claim 1 wherein the hydrophobic modification of the water soluble polymer comprises at least one alkyl side chain of 15 or 16 carbon atoms.

20. The composition of claim 1 wherein the hydrophobic modification of the water soluble polymer comprises at least one alkyl side chain of not more than about 24 carbon atoms.

21. The composition of claim 1 wherein the hydrophobic modification of the water soluble polymer comprises at least one alkyl side chain of not more than about 22 carbon atoms.

22. The composition of claim 1 wherein the hydrophobic modification of the water soluble polymer comprises at least one alkyl side chain of not more than about 20 carbon atoms.

23. The composition of claim 1 wherein the hydrophobic modification of the water soluble polymer comprises at least one alkyl side chain of not more than about 18 carbon atoms.

24. The composition of claim 1, wherein said composition is in the form of a substantially uniform dispersion.

25. The composition of claim 1 wherein the sizing agent comprises a reactive sizing agent.

26. The composition of claim 25 wherein the reactive sizing agent comprises an alkenyl ketene dimer.

27. The composition of claim 1 wherein the reactive sizing agent is selected from the group consisting of alkyl ketene dimers, alkenyl succinic anhydrides, alkenyl ketene dimers and alkenyl ketene multimers.

28. The composition of claim 1 wherein the sizing agent is a liquid.

29. The composition of claim 1 wherein the sizing agent comprises a nonreactive sizing agent.

30. The composition of claim 29 wherein the sizing agent is selected from the group consisting of polymer emulsion sizing agents and rosin sizing agents.

31. The composition of claim 1, comprising at least one reactive sizing agent and at least one nonreactive sizing agent.

32. The composition of claim 1, further comprising a salt.

33. The composition of claim 32, wherein the salt is selected from the group consisting of halides of calcium, magnesium, and barium.

34. The composition of claim 32 wherein the salt is selected from the group consisting calcium chloride, magnesium chloride, magnesium bromide, calcium bromide, calcium nitrate, magnesium nitrate, calcium acetate, and magnesium acetate.

* * * * *